US006193157B1

United States Patent
Dickson et al.

(12) United States Patent
(10) Patent No.: US 6,193,157 B1
(45) Date of Patent: Feb. 27, 2001

(54) FREQUENCY DIVISION MULTIPLEXED BAR CODE SCANNER

(75) Inventors: Karen M. Dickson, Canton; John F. Dwinell, Wrentham; Peter V. Crole, Sherborn, all of MA (US)

(73) Assignee: CiMatrix, Canton, MA (US)

(*) Notice: Subject to any disclaimer, the term of this patent is extended or adjusted under 35 U.S.C. 154(b) by 0 days.

(21) Appl. No.: 09/122,903

(22) Filed: Jul. 27, 1998

(51) Int. Cl.[7] .................................................. G06K 7/10
(52) U.S. Cl. ................. 235/462.01; 235/454; 235/455; 235/447; 385/1; 385/10
(58) Field of Search .................... 235/462.01, 462.27, 235/462.29, 462.42, 462.05, 454, 455, 447, 440, 470; 385/1, 16

(56) References Cited

U.S. PATENT DOCUMENTS

| 4,591,242 | * | 5/1986 | Broockman et al. .................. 350/3 |
| 4,877,949 | * | 10/1989 | Danielson .............................. 235/462 |
| 5,426,288 | * | 6/1995 | Obata et al. .......................... 235/462 |
| 5,483,051 | | 1/1996 | Marchi ............................. 235/462.01 |
| 5,661,561 | | 8/1997 | Wurz et al. ........................... 356/386 |
| 5,777,311 | * | 7/1998 | Keinath et al. ....................... 235/462 |
| 5,877,493 | * | 3/1999 | Richard ........................... 250/227.11 |
| 5,889,278 | * | 3/1999 | Richard ............................... 250/214 |

* cited by examiner

Primary Examiner—Thien M. Le
Assistant Examiner—Daniel S Felten
(74) Attorney, Agent, or Firm—Iandiorio & Teska (57) ABSTRACT

A frequency division multiplexed bar code scanner system includes a plurality of radiation sources for simultaneously providing a plurality of source beams, and a modulator circuit for modulating the intensity of each source beam at a different frequency. The source beams are combined and directed along a path to a bar code to be read; the return combined reflected light patterns are amplitude modulated by the bar code and are detected and the amplitude modulation of at least one of these patterns is detected to obtain a representation of the bar code read. The phase shift between the source beam and at least one of the reflected light patterns is used to determine the distance to the barcode bearing object. Distance information may be used to improve barcode reading performance.

17 Claims, 8 Drawing Sheets

FREQUENCY DIVISION MULTIPLEXED BAR CODE SCANNER

FIELD OF INVENTION

This invention relates to a frequency division multiplexed bar code scanner, and more particularly to such a scanner which detects the bar code and the distance of the object bearing the bar code over a large depth of focus.

BACKGROUND OF INVENTION

Bar code readers are required to read bar codes on objects of a wide variety of sizes wherein the bar codes may be at varying distances from the scanner. This requires a wide range of depths of focus in order to read the bar code clearly and accurately over the entire distance in which they may be presented, typically as much as two meters. In one approach two or more lasers focused at different distances are switched on and off alternately so that only one is on at a time. This requires a switching device to switch between them so that the scan rate is divided by the number of lasers and thus significantly reduced. Thus a faster, more expensive motor is needed to rotate the scanning wheel at a higher rate, or higher speed scanning cannot be done. Alternatively, additional systems may be used to intelligently switch the lasers at optimum times but this is a more complex and expensive approach. In another approach a number of separate scanning channels are used each including its own laser, optics, and receiver which increases cost and complexity. In still another approach mechanical auto focus mechanisms are used but these have many moving parts and are relatively slow, expensive and prone to wear out.

SUMMARY OF INVENTION

It is therefore an object of this invention to provide an improved, frequency division multiplexed bar code scanner.

It is a further object of this invention to provide such an improved, frequency division multiplexed bar code scanner which detects the bar code and the distance to the object bearing the bar code over an enlarged depth of focus.

It is a further object of this invention to provide such an improved, frequency division multiplexed bar code scanner which may use but a single optical channel including laser, optics, and receiver.

It is a further object of this invention to provide such an improved, frequency division multiplexed bar code scanner which has an enlarged depth of focus without additional moving parts.

It is a further object of this invention to provide such an improved, frequency division multiplexed bar code scanner which does not require automatic intelligent control.

It is a further object of this invention to provide such an improved, frequency division multiplexed bar code scanner which implements bar code reading and distance measurement in one integrated system.

It is a further object of this invention to provide such an improved, frequency division multiplexed bar code scanner which employs the same scanner source modulation to increase the reading range and accurately determine the distance.

It is a further object of this invention to provide such an improved, frequency division multiplexed bar code scanner which has a capability to utilize distance measurement information to improve the bar code reading capability of the scanner.

It is a further object of this invention to provide such an improved, frequency division multiplexed bar code scanner which has a capability to intelligently select between lasers to improve the distance measurement accuracy of the scanner.

The invention results from the realization that an improved bar code reader and/or distance measuring system can be effected by amplitude modulating a plurality of laser sources, each with different focal lengths and modulating frequencies, to allow them to share the same optical path thus simply extending the bar code reading range; to use the same modulation to determine the distance by measurement of the phase difference between the outgoing and return laser beam; and to provide the capability of using distance information to improve bar code reading performance.

This invention features a frequency division multiplexed bar code scanner system including a plurality of radiation sources for simultaneously providing a plurality of source beams and a modulator circuit for modulating the intensity of each source beam at a different frequency. There are means for combining the source beams and directing them along a path to a bar code to be read. There are means for receiving the returning combined source beams amplitude modulated by the bar code and means responsive to the returning combined source beams for detecting the amplitude modulation of at least one of the source beams representative of the bar code read.

In a preferred embodiment the radiation sources may be lasers. The modulator circuit may include means for varying the amplitude of each radiation source at the modulating frequency. The means for combining may include means for coaxially combining the source beams or means for collinearly combining them. The means for receiving may include collection optics for collecting the radiation of the returning source beams and a sensor circuit for converting the returning source beams to an electrical signal. The means for detecting amplitude modulation may include a phase locked loop circuit. There may be means for determining which of the source beams to detect for decoding the bar code.

The invention also features a frequency division multiplexed scanner system including a plurality of radiation sources for simultaneously providing a plurality of source beams. A modulator circuit modulates the intensity of each beam at a different frequency for defining a different distance range. There are means for combining the source beams and directing them along a path to a target. There are also means for receiving the returning combined source beams reflected from the target and means responsive to the returning combined source beams for detecting the phase shift of at least one of the source beams representative of the distance of the target from the scanner.

In a preferred embodiment the radiation sources may be lasers. The modulator circuit may include means for varying the power to each radiation source at the modulating frequency. The means for combining may include means for coaxially combining the source beams or collinearly combining the source beams. The means for receiving may include collection optics for collecting the radiation of the returning source beams and a sensor circuit for converting the returning source beams to an electrical signal. The means for detecting the phase shift may include a phase comparator circuit. There may be means for determining which of the source beams to detect for indicating the phase shift.

The invention also features a frequency division multiplexed bar code scanner system including a plurality of radiation sources for simultaneously providing a plurality of source beams and a modulator circuit for modulating the intensity of each source beam at a different frequency. There may be means for combining the source beams and directing them along a path to a bar code bearing object. There are means for receiving the returning combined source beams reflected from the object amplitude modulated by the bar code and phase shifted in accordance with the distance between the object and scanner. There are means responsive to the returning combined source beams for detecting the amplitude modulation of at least one of the source beams representative of the bar code read and for detecting the phase shift of at least one of the source beams representative of the distance of the object from the scanner.

In a preferred embodiment the radiation sources may be lasers. The modulator circuit may include means for varying the power to each radiation source at the modulating frequency. The means for combining may include means for coaxially combining the source beams or means for collinearly combining them. The means for receiving may include collection optics for collecting the radiation of the returning source beams and a sensor circuit for converting the returning source beams to an electrical signal. The means for detecting amplitude modulation includes a phase locked loop circuit. The means for detecting the phase shift may include a phase comparator circuit. There may be means for determining which of the source beams to detect for decoding the bar code and the phase shift.

DISCLOSURE OF PREFERRED EMBODIMENT

Other objects, features and advantages will occur to those skilled in the art from the following description of a preferred embodiment and the accompanying drawings, in which.

The invention involves the use of high-frequency amplitude modulation of a laser beam for several purposes, principally to extend the reading range of bar codes, to accurately determine the distance to barcode-bearing objects, and to reject ambient light. The frequency division multiplexing of multiple laser beams with multiple focal points along the same optical path extends the bar code reading range. Each laser beam is focused to a unique focal point with the depth of focus of each laser slightly overlapping that of the next to create an overall large depth of focus. Each laser is amplitude modulated with a different carrier frequency with sufficient carrier frequency separation for correct demodulation in a receiver circuit. The form of the amplitude modulation is any repetitive waveform, which may include but is not limited to a cosine wave, a square wave, and a pulse-train. All laser beams emerge from the scanner along essentially the same optical path although slight offsets are acceptable, and return light reflected from the bar code is received by a single optical receiver such as a collection lens and photodiode and demodulated by multiple receiver circuit channels. Each demodulation circuit channel includes an electrical filter that is tuned to the particular modulation frequency of one of the lasers which separates the signal due to this laser from the signals due to other lasers, thus substantially improving the signal to noise performance of the circuit. As ambient light is unmodulated it is rejected in favor of returning laser light, thus improving bar code reading performance in bright lighting conditions. The demodulation circuit outputs are further processed with the end result being decoded bar code information.

Figure 1:
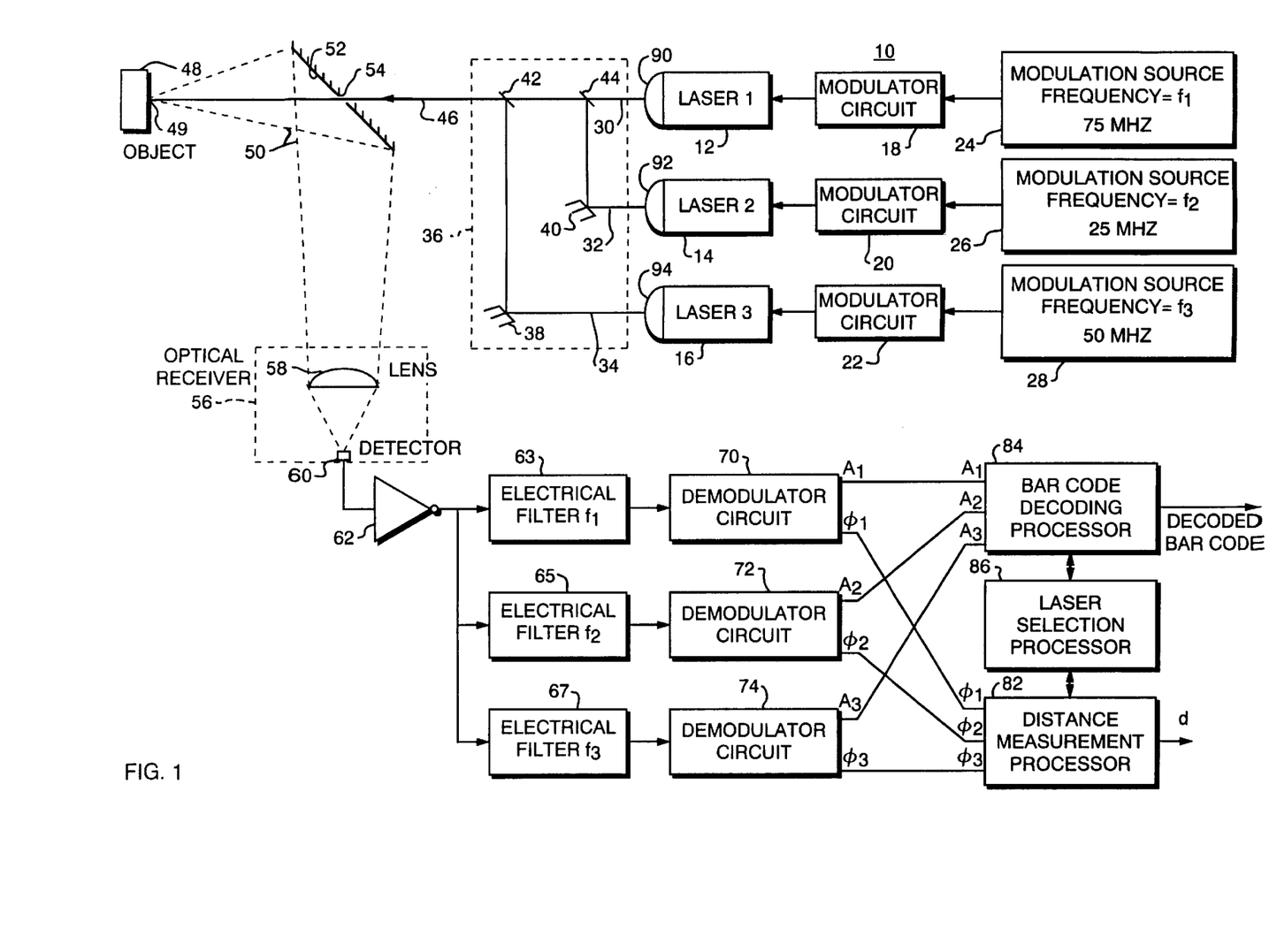
FIG. 1 is a schematic block diagram of a frequency division multiplexed scanner system according to this invention.

There is shown in FIG. 1 one embodiment of a frequency division multiplexed scanner system 10 according to this invention which includes a plurality of lasers 12, 14, 16 whose outputs are modulated by modulator circuits 18, 20 and 22 each with a different frequency in the range typically of 10–100 MHz provided by the sources 24, 26 and 28. Source 24 provides a frequency $f_1$ of 75 MHz, source 26 provides a frequency $f_2$ of 25 MHz, and source 28 provides a frequency $f_3$ of 50 MHz. The output of each laser has a square wave form: beams 30, 32 and 34, respectively. These beams are combined in beam combiner 36 which in this implementation employs two mirrors 38 and 40 and two beamsplitters 42 and 44, so that all three beams can be combined and directed as a single beam 46 to the object or target 48 bearing a bar code label 49. The reflected light pattern 50 returning from the target strikes mirror 52 which has a center aperture 54 for permitting propagation of output beam 46, and is received by the optical receiver optics 56 which may include, for example, lens optics 58 and a photodiode 60. The electrical output is directed to receiver circuit 62. Return light 50 consists of the sum of return light patterns generated by the beams 30, 32, and 34 present in the original output beam 46. The electrical output of receiver circuit 62 contains a signal representative of the sum of all return light patterns, where each light pattern consists of high frequency amplitude modulation due to the source 24, 26, or 28, imposed on a lower frequency amplitude modulation A(t) due to the reflectance properties of the bar code 49. This signal is input to electrical filters 63, 65, and 67, each of which is tuned to pass a small range of frequencies surrounding the modulation frequency of one of the lasers, and which separates the signal due to this laser from signals due to other lasers. The output of each filter is input to a demodulator 70, 72, or 74. Demodulator 70 receives frequency $f_1$ input from source 24 and produces an output providing the amplitude $A_1(t)$ representing the reflectance of the barcode due to beam 30, and the phase $\phi_1(t)$ representing the phase difference between outgoing beam 30 and the return light 50 from the target. Demodulator 72 receives the frequency input $f_2$ from source 26 and provides at its output the amplitude $A_2(t)$ and the phase $\phi_2(t)$ due to beam 32. Likewise, modulator 74 receives a frequency $f_3$ from source 28 and provides at its output the amplitude $A_3(t)$ and the phase $\phi_3(t)$ due to beam 34. The phase output signal from each of the demodulators is delivered to the distance measurement processor 82 which selects one of the signals and converts the signal representative of the phase to a distance d representative of the distance from the scanner to the target or object 48. The amplitude output signal from each of the demodulators is delivered to the bar code decoding processor 84 which selects one of the signals and decodes the code read from the bar code label 49. Laser selection processor 86 determines which one of the multiple demodulator outputs that the bar code decoding and distance measurement processors will use to determine their respective outputs of distance and code. The particular circuits used to implement bar code decoding processor 84 and distance measurement processor 82 are not essential to this invention, but a typical circuit for a bar code decoding processor is a microprocessor that matches the sequence of bar code bar and space widths A(t) with predefined patterns, and for a distance measurement processor is an analog-to-digital converter.

Figure 2:
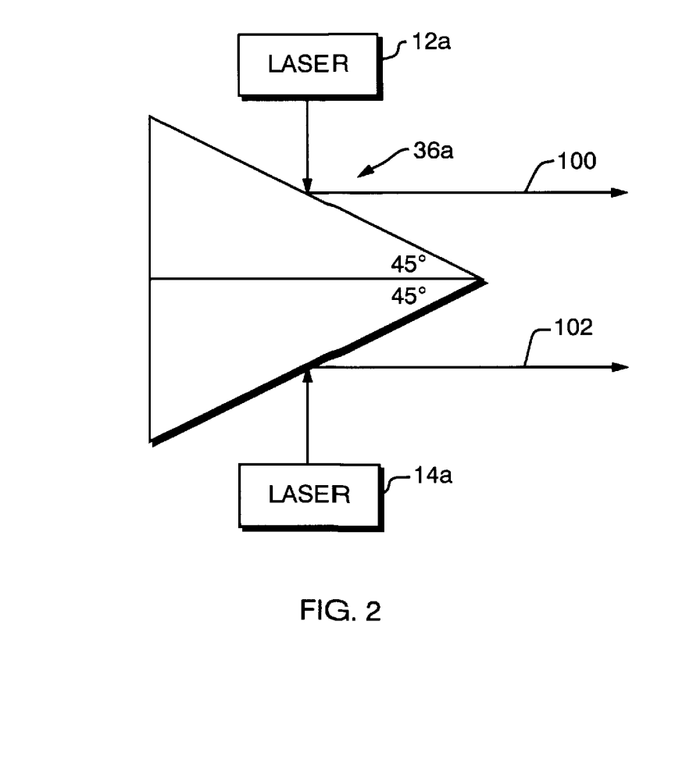
FIG. 2 shows an alternate construction of an implementation of a beam combiner as shown in FIG. 1.
Figure 3:
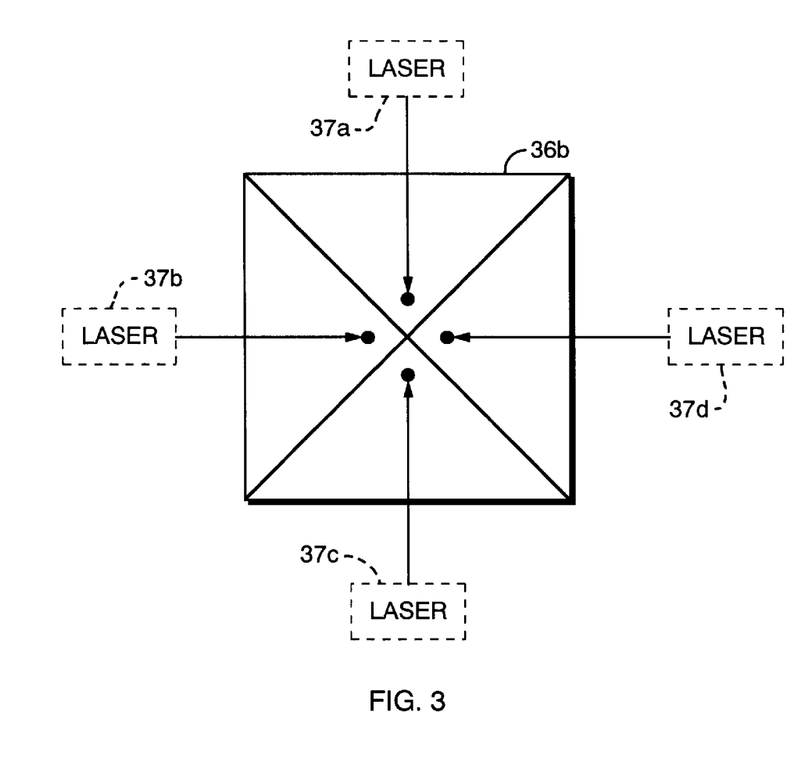
FIG. 3 is a schematic top plan view of an enlarged beam combiner similar to that of FIG. 2.

Each of the lasers 12, 14, 16 includes focusing optics 90, 92, 94 which determine the focal point for each of the lasers. Although the beam combiner 36 is shown as including a number of mirrors and beamsplitters, this is not a necessary limitation of the invention as, for example, a multifaceted prism 36a, FIG. 2, may be used to reflect the beams from lasers 12a, 14a along adjacent collinear paths 100, 102 in contrast to the coaxial combining of beams 30, 32 and 34 into one beam 46 in beam combiner 36, FIG. 1. The prism may be made to have any number of faces or facets to accommodate the number of lasers used. For example, in FIG. 3 a plan view of a four-faceted or pyramidical prism 36b is depicted which serves to receive beams from four lasers 37a, b, c, d.

Figure 4:
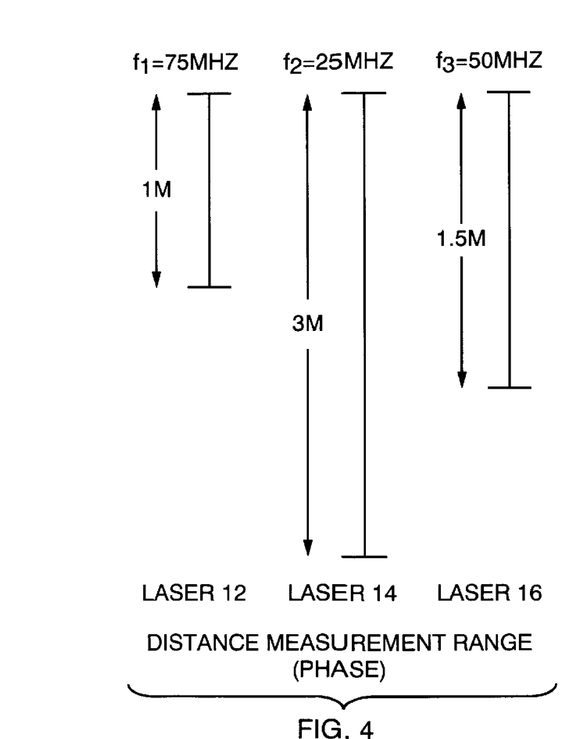
FIG. 4 is a graphical illustration of the different distant measurement ranges afforded by the different modulation frequencies of each of the lasers of FIG. 1.

Each laser has a different distance measuring range by virtue of the frequency with which it is modulated. For example, laser 12, FIG. 4, modulated with a frequency $f_1$ of 75 MHz, has a one meter range; laser 14, modulated with frequency $f_2$ of 25 MHz has a three meter range; and laser 16, modulated with a frequency $f_3$ of 50 MHz, has a 1.5 meter range. The distance measurement range d is determined from the relationship d'=c/f where d' is the total light travel distance and c is the speed of light. As light travels out and back to the target, the total travel is twice the distance measurement range. As a phase detector produces unique results for only half a cycle, from 0–180°, the range is halved again. Thus the measurement range d is equal to d'/4=c/4f. The accuracy of the distance measurement improves as the range is made smaller, thus by using multiple lasers with multiple modulation frequencies it is possible to measure both a large distance with lower accuracy and a smaller distance with higher accuracy, without automatic intelligent control or additional moving parts.

Figure 5:
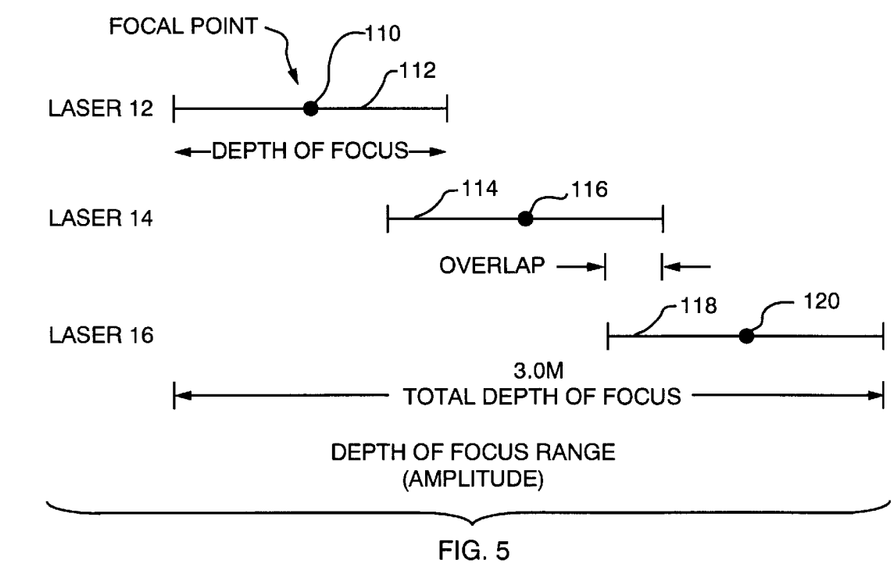
FIG. 5 is a schematic graphical representation of the depth of focus range of each of the lasers of FIG. 1.

The focal point of each laser 12, 14, 16 is set by the focusing optics 90, 92 and 94 associated with each as shown in FIG. 5, where laser 12 has a focal point 110 and a depth of focus 112 which overlaps slightly with the depth of focus 114 of laser 14 whose focal point is at 116, and the depth of focus 114 of laser 14 overlaps somewhat with the depth of focus 118 of laser 16 which is focused at point 120. The total depth of focus of the system is thus nearly three times the depth of focus of each individual laser, where an individual laser has a typical depth of focus of one meter.

Figure 6:
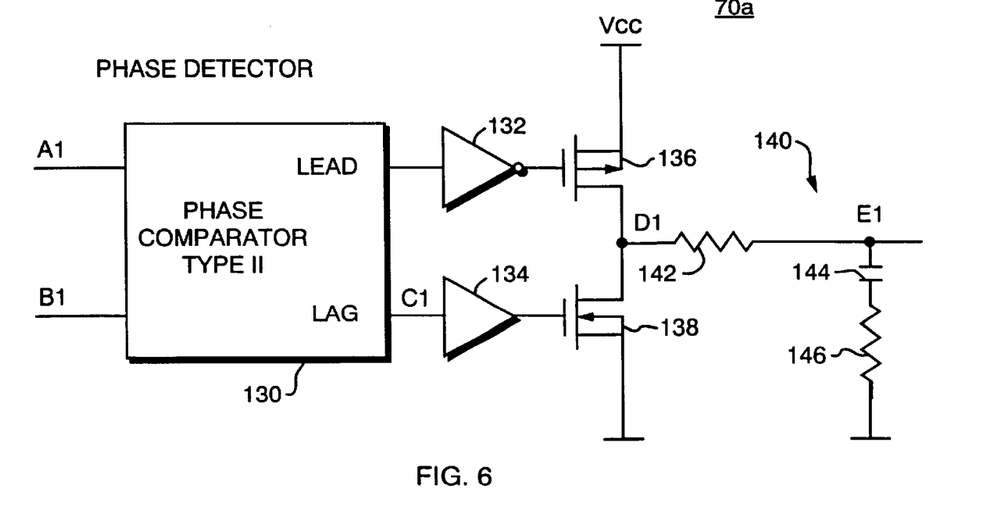
FIG. 6 is a schematic diagram of one implementation of the demodulators of FIG. 1 for detecting phase information to determine the distance.

The phase detector portion 70a of demodulators 70, 72 and 74, FIG. 6, may be implemented, for example, using a phase comparator 130 which receives at one input the return light signal and at the other the original modulating source. The lead output from phase comparator 130 is delivered to an inverting amplifier 132 while the lag output is fed to noninverting amplifier 134. The outputs of both amplifiers are connected to a pair of field effect transistors 136 and 138 connected between $V_{cc}$ and ground to form a charge pump the output of which is delivered to a low pass filter 140 employing resistor 142 interconnected with a series circuit of capacitor 144 and resistor 146.

Figure 7:
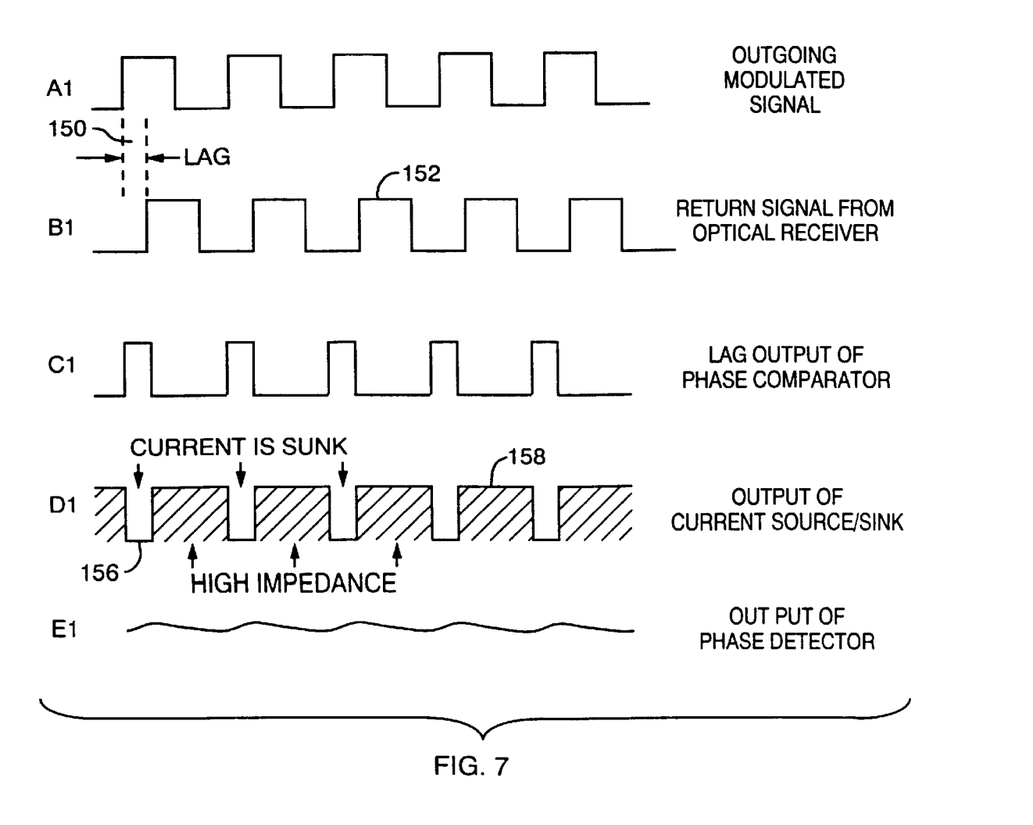
FIG. 7 is an illustration of the waveforms that occur at specific points in the circuit of FIG. 6.
Figure 8:
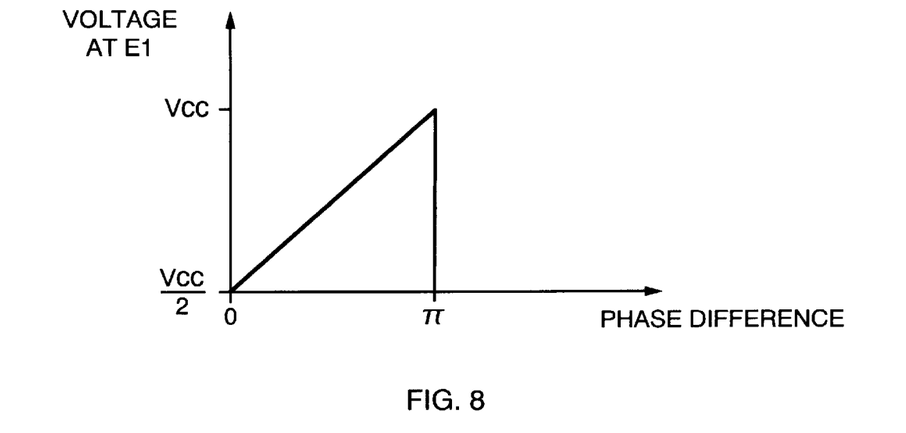
FIG. 8 is a graphical illustration of the variation in output voltage with respect to the sensed phase difference in FIG. 6.

The signals appearing at $A_1$, $B_1$, $C_1$, $D_1$ and $E_1$ are shown in FIG. 7, where at $A_1$ is the original modulating signal, a square wave, and at $B_1$ is the return signal amplitude modulated due to the bar code which lags by some amount 150 the original modulating signal at $A_1$, where the lag time is dependent on the distance to the target. The signal at $C_1$ from the lag output of phase comparator 130 represents the lag 150 between the original modulating signal at $A_1$ and the return signal at $B_1$. The output at $D_1$ of the charge pump acts as a current source/sink where the current is being sunk as at 156 while $C_1$ is active and a high impedance is seen at 158 while $C_1$ is inactive. In operation, signal $E_1$ at the capacitor 144 charges to a constant voltage $V_o$ that is linearly proportional to the phase. The variation of the voltage $V_o$ at $E_1$ with phase from 0 to $\pi$ is shown in FIG. 8.

Figure 9:
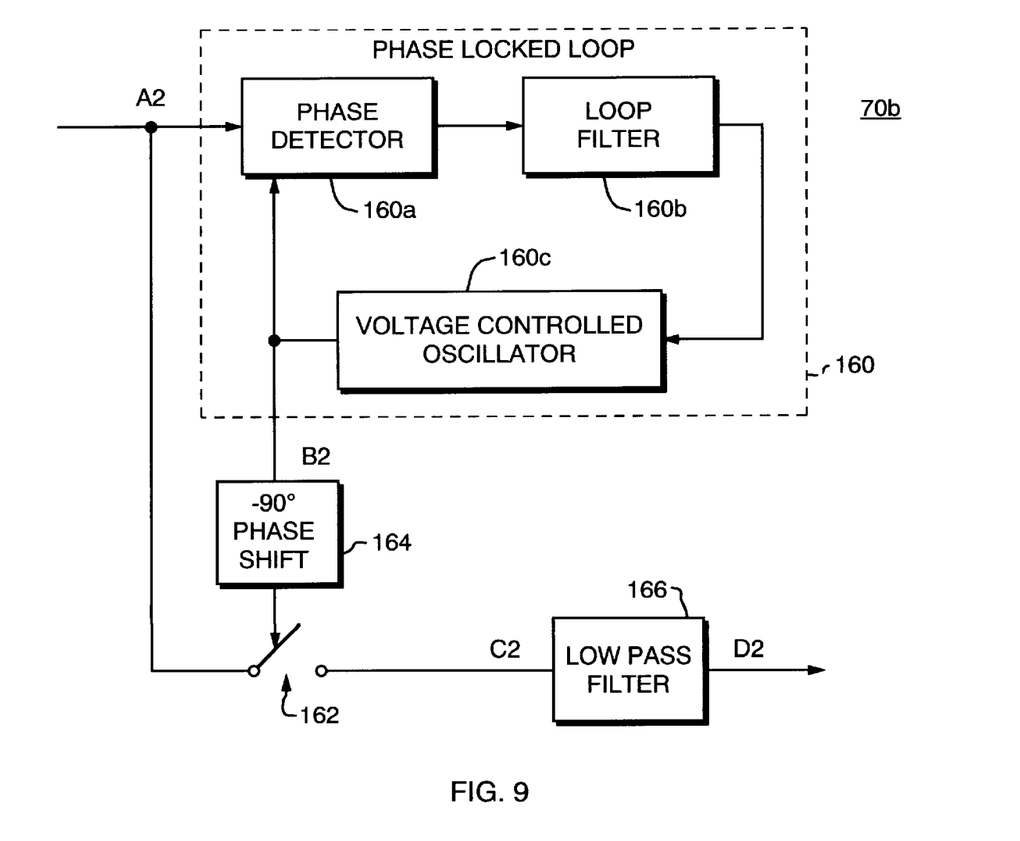
FIG. 9 is a schematic diagram of one implementation of the demodulators of FIG. 1 for detecting amplitude information to determine the bar code content.

The amplitude detector portion 70b of demodulators 70, 72 and 74 may be implemented, FIG. 9, with a phase locked loop circuit 160 including phase detector 160a, loop filter 160b and voltage controlled oscillator 160c. The return light signal input to phase locked loop circuit 160 is also delivered to switch 162 which is controlled by the frequency locked output signal from phase locked loop 160 retarded by 90° in circuit 164 to accommodate for integration of the phase to frequency which shifts the phase by 90°. The output of switch 162 is delivered to low pass filter 166 to provide the output amplitude at $D_2$.

Figure 10:
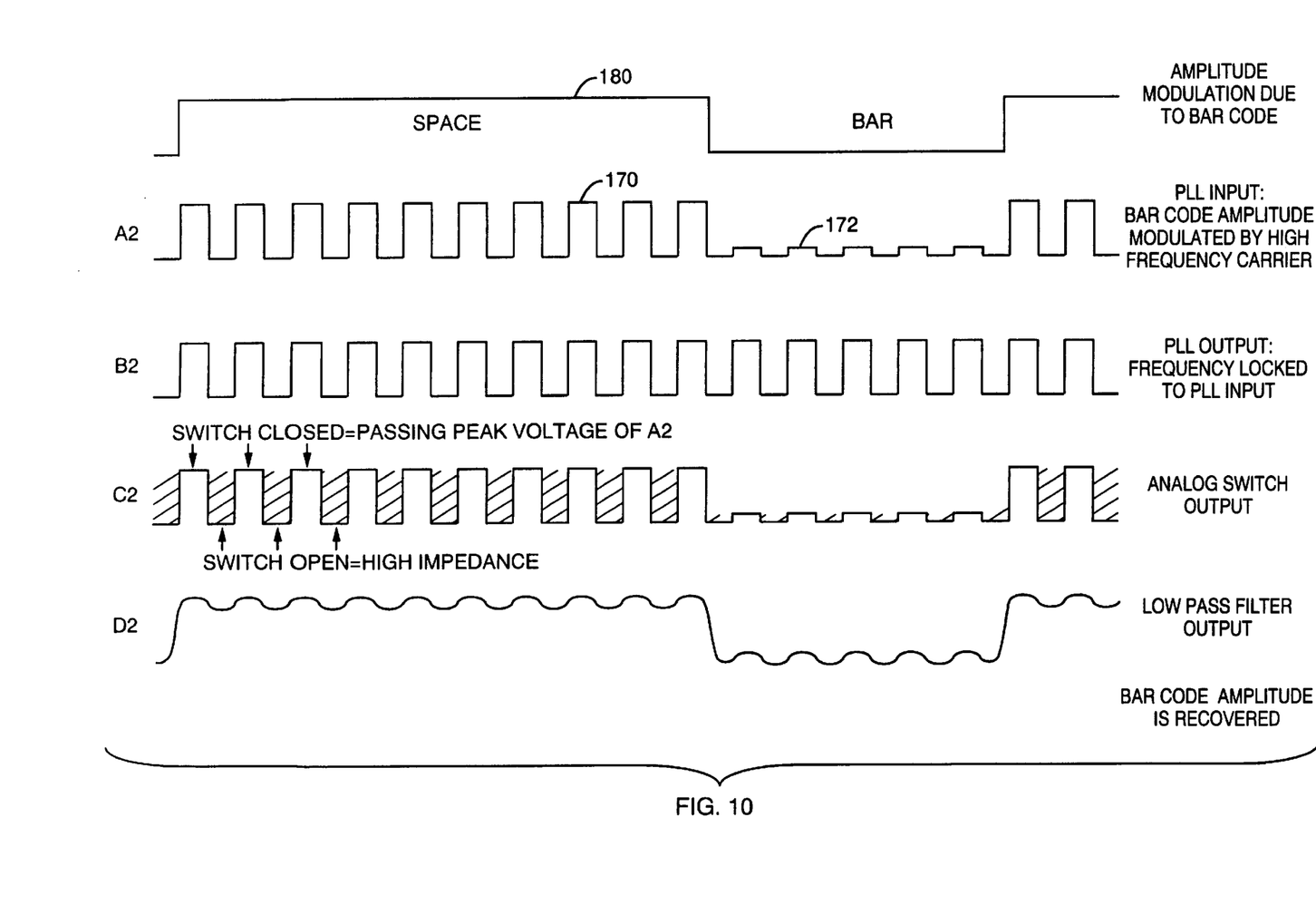
FIG. 10 is an illustration of the waveforms which occur at specific points in FIG. 9.

The form of the signals at various points $A_2$, $B_2$, $C_2$, $D_2$ in FIG. 9 are depicted in FIG. 10, where it can be seen that the signal at $A_2$ represents the input of phase locked loop circuit 160 which is the bar code signal amplitude modulated by the high frequency carrier. Therefore, there is a difference in the amplitude levels 170, 172, for example. The output at $B_2$ from the phase locked loop circuit 160 is the same frequency and phase as the input to the phase locked loop circuit and this is used to drive the analog switch. The analog switch output, which has the form of a square wave at $C_2$, is in the closed state and thus charging the low pass filter 166 only during the peaks of signal $A_2$. The signal at $D_2$ represents the low pass filter 166 output which is a voltage that is an effective average of the peak values of signal $A_2$, and is thus a representation of the amplitude modulation due to the bar code 180.

Figure 11:
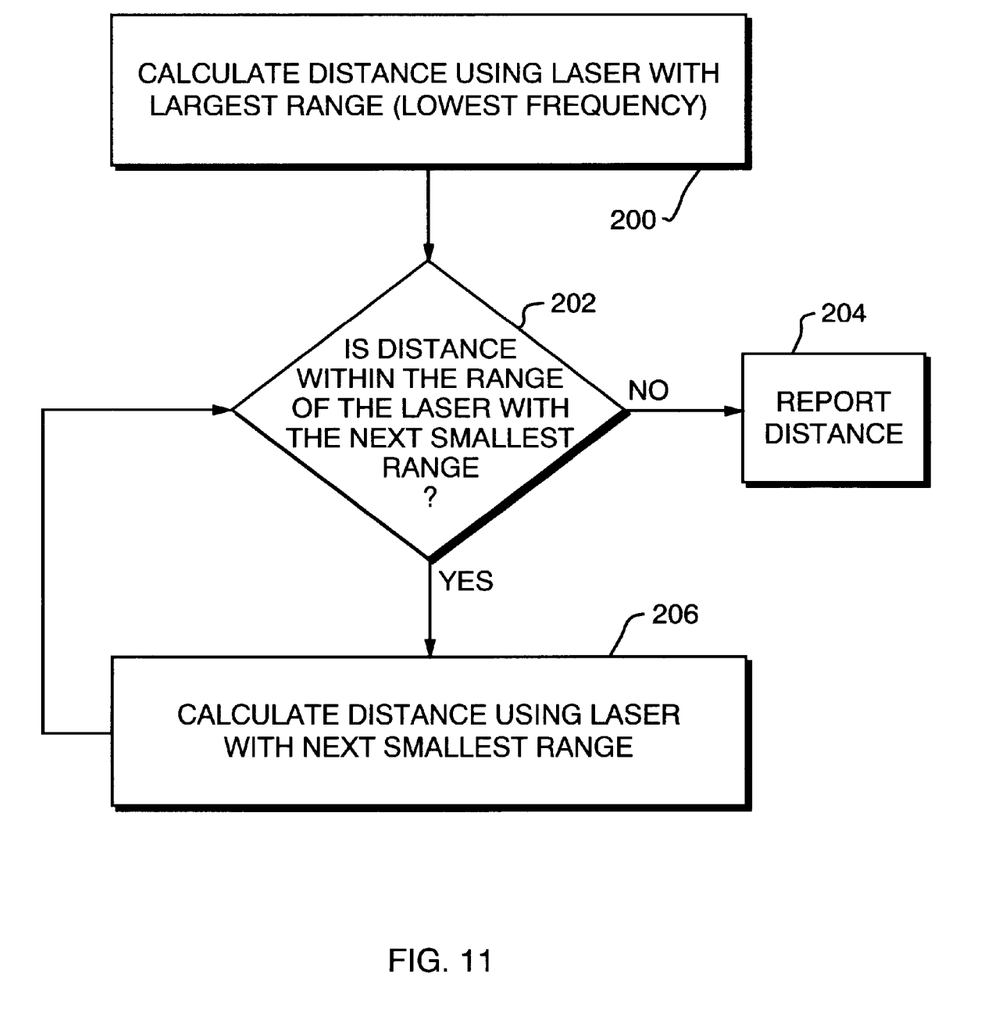
FIG. 11 is a flow chart of the software for implementing the processor of FIG. 1 to select the optimal laser source for distance measurement.
Figure 12:
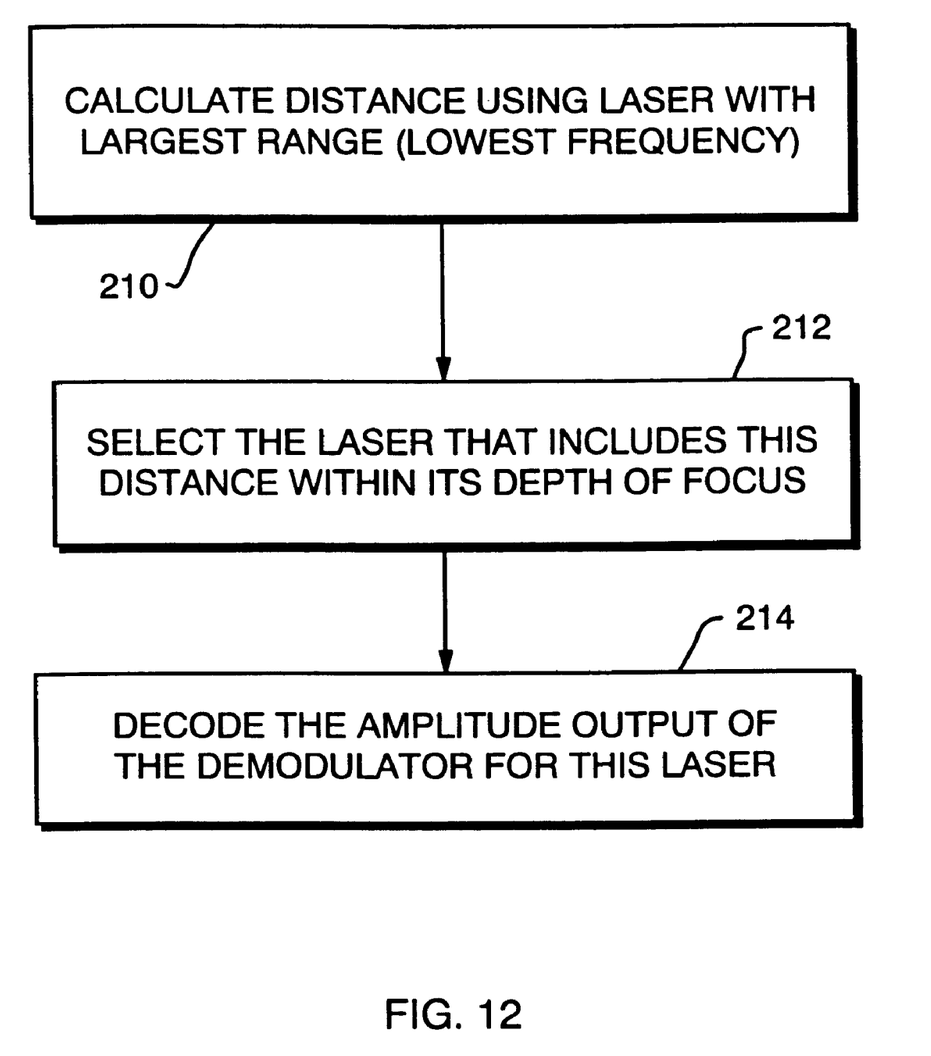
FIG. 12 is a flow chart of the software for implementation for the processor of FIG. 1 to select the optimal laser source for bar code decoding.

Laser selection processor 86, FIG. 1, may be programmed to select the laser yielding the highest accuracy result for distance measurement processor 82 in accordance with the flow chart of FIG. 11, where laser selection processor 86 first selects the laser with the lowest frequency, that is, the largest distance range and lowest accuracy, in step 200. Then distance is calculated using this laser, and query is made as to whether the distance is within the range of the next source in step 202. If it is not, that distance is reported at 204. If it is, then the laser with the next smaller distance range and which due its higher frequency has better accuracy is selected at step 206 and the system returns to query 202. Laser selection processor 86 selects the best bar code decode laser source for bar code decoding processor 84 in accordance with the flow chart shown in FIG. 12, where the target distance is first calculated using the laser with the largest distance range 210. The laser with a depth of focus that includes the target distance is then selected, step 212, to be processed for bar code decoding in step 214.

The preferred embodiment uses square wave modulation, but any repetitive waveform may be used. The preferred embodiment uses three lasers, but any number of lasers may be used. The preferred embodiment uses a phase locked loop for amplitude detection and a type II phase detector for phase detection, but any of the circuits known in the art may be used. The preferred embodiment uses a laser selection processor to intelligently select which of the plurality of laser signals is to be used for bar code decoding and distance measurement, but the bar code decoding and distance measurement functions may be implemented without intelligent control or with an alternate method of intelligent control. The preferred embodiment shows the bar code and distance measurement functions sharing optical, mechanical and electrical components, but these may also be implemented independently of each other, or one may be implemented without the other.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A frequency division multiplexed scanner system comprising:

a plurality of radiation sources for simultaneously providing a plurality of source beams each having an intensity;

a modulator circuit for modulating the intensity of each source beam at a different frequency;

means for combining the source beams and directing them along a path to a bar code to be read;

means for receiving the source beams reflected from and amplitude modulated by the bar code; and means, responsive to the source beams reflected from the bar code, for detecting the amplitude modulation of at least one of said source beams representative of the bar code read.

2. The scanner system of claim 1 in which said radiation sources are lasers.

3. The scanner system of claim 1 in which said modulator circuit includes means for varying the amplitude of each said radiation source at the modulating frequency.

4. The scanner system of claim 1 in which said means for combining includes means for coaxially combining said source beams.

5. The scanner system of claim 1 in which said means for combining includes means for collinearly combining said source beams.

6. The scanner system of claim 1 in which said means for receiving includes collection optics for collecting the radiation of the returning source beams and a sensor circuit for converting the returning source beams to an electrical signal.

7. The scanner system of claim 1 in which said means for detecting the amplitude modulation includes a phase locked loop circuit.

8. The scanner system of claim 1 further including means for determining which of the source beams to detect for decoding the bar code.

9. A frequency division multiplexed bar code scanner system comprising:

a plurality of radiation sources for simultaneously providing a plurality of source beams each having an intensity;

a modulator circuit for modulating the intensity of each source beam at a different frequency;

means for combining the source beams and directing them along a path to a bar code bearing object;

means for receiving the source beams reflected from the object amplitude modulated by the bar code and phase shifted in accordance with the distance between the object and scanner;

means responsive to the source beams reflected from the object for detecting the amplitude modulation of at least one of said source beams representative of the bar code read and for detecting the phase shift of at least one of said source beams representative of the distance to the object from the scanner.

10. The scanner system of claim 9 in which said radiation sources are lasers.

11. The scanner system of claim 9 in which said modulator circuit includes means for varying the power to each said radiation source at the modulating frequency.

12. The scanner system of claim 9 in which said means for combining includes means for coaxially combining said source beams.

13. The scanner system of claim 9 in which said means for combining includes means for collinearly combining said source beams.

14. The scanner system of claim 9 in which said means for receiving includes collection optics for collecting the radiation of the returning source beams and a sensor circuit for converting the returning source beams to an electrical signal.

15. The scanner system of claim 9 in which said means for detecting the amplitude modulation includes a phase locked loop circuit.

16. The scanner system of claim 9 in which said means for detecting the phase shift includes a phase comparator circuit.

17. The scanner system of claim 9 further including means for determining which of the source beams to detect for decoding the bar code and measuring the phase shift.

* * * * *